Patented Feb. 1, 1927.

1,615,973

UNITED STATES PATENT OFFICE.

MARTIN L. BURGESS, OF INDIANAPOLIS, INDIANA, ASSIGNOR TO THE MARIETTA MANUFACTURING COMPANY, OF INDIANAPOLIS, INDIANA, A CORPORATION.

PROCESS OF COLORING GLASSWARE.

No Drawing.   Application filed November 17, 1923.   Serial No. 675,377.

This invention relates to the process of manufacturing colored and artistically designed or ornamental glassware adaptable for use as wainscoting for walls, table tops or the like. It is particularly useful for use in place of enameled wall tile, such as is used in bath rooms, kitchens, restaurants and the like, and where it is desirable to use ornamental and colored borders.

The main feature of the invention lies in the process of coloring the surface of the glass plate or slab during its formation and before it passes to the annealing oven or leer whereby the coloring will become baked in and hardened. This process, on the one hand, eliminates the fading, washing or marring of the color where it is not subsequently baked in; or avoids passing the glass through a baking oven a second time.

Another feature of the invention lies in the method of applying the coloring medium to the molten glass immediately after it has been rolled into a slab and before it has become hardened, whereby the coloring thereof forms a part of the glass, rather than a coating of material. This results in a very thin layer or thickness of colored glass as compared with the layer or thickness of separate coloring medium where it is applied in the usual manner. This is affected by applying a chemical to the glass in the form of a spray which re-acts thereon, producing the desired color and forming a very hard but thin surface which will resist scratching, wear, etc. At the same time the nature of the chemical reaction producing the color and forming a relatively thin colored surface readily permits of decorative configurations being produced thereon by the usual sand blast operation through a stencil, cutting away the colored portion of the glass, and bringing out the natural coloring in contrast thereto.

The process of producing the colored and ornamental glass pieces as above referred to consists in pouring the molten glass on the usual table or metal surface, the body of the glass being suitably colored in the furnace and rolling the molten glass on the table or surface into a flat slab of the desired thickness and dimensions, in the usual manner. While the glass still retains its high degree of heat, and is in a semi-molten state, the secondary coloring or surface coloring is applied in the following manner. A chemical solution is prepared which may consist of different combinations of chemicals or formulas, depending upon the surface color designed and the basic color of the body of the glass. For purposes of illustration, a chemical solution may be used comprising copper sulphate dissolved in substantially its same weight of sulphuric acid and diluted with sufficient water to produce a five per cent solution. This solution is sprayed on to the surface of the molten glass slab by any suitable spray of the type commonly used for applying a coloring medium to objects. Upon the spraying of the solution, a chemical reaction takes place between the chemicals of the spray and the semi-molten glass, such as will produce a coloring, dependent upon the chemical solution and basic glass coloring.

After the chemical solution has been applied, the slab of glass is carried to the annealing oven or leer through which it passes in the usual manner, causing the coloring produced by the chemical reaction to be thoroughly baked and hardened in the glass. This process, as above noted, instead of adding a coloring medium, produces the color in the surface of the glass itself, by a chemical reaction, whereby the color is a part of the glass rather than an additional surface. The chemical reaction and baking process further acts to produce a hard smooth surface which will withstand scratching or similar mutilation.

Decorative effects may thereafter be executed upon the colored surface of the glass by employing a stencil in which the design is cut, and applying the usual sand blast operation thereto so as to cut away the colored surface and bring out the basic color of the glass to give the desired effect.

It will be noted from the above described process that there are no coloring pigments and there is no layer or thickness of coloring material used; and furthermore the coloring operation is completed during the process of manufacture of the article and any re-baking process is eliminated, as would be necessary if the coloring medium were applied after the annealing of the glass.

The invention claimed is:

The process of producing colored glassware consisting in mixing with each batch a coloring medium in the furnace for coloring the glass throughout the body thereof, rolling the colored molten glass into a substantially flat slab of desired thickness, spraying on the surface while still hot from the rolling operation a solution of copper sulphate and sulphuric acid dissolved and diluted with water, and thereafter passing the glass through an annealing oven for causing the surface coloring produced by said solution to be thoroughly baked and hardened therein.

In witness whereof, I have hereunto affixed my signature.

MARTIN L. BURGESS.